April 23, 1940.  A. W. LEWIS  2,198,053
JOURNAL BEARING FOR RAILROAD CARS
Original Filed April 24, 1936
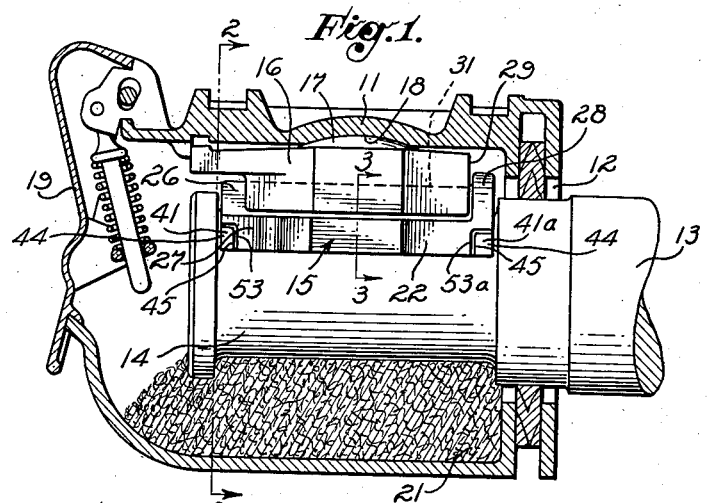
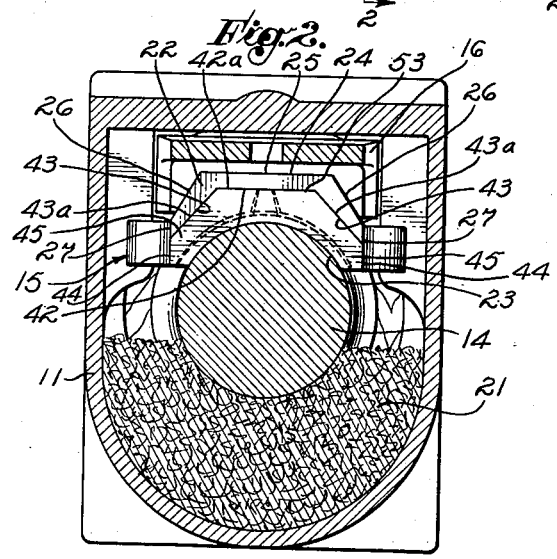
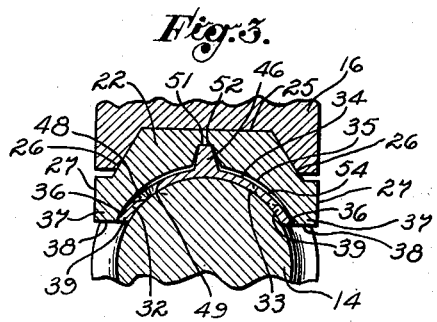
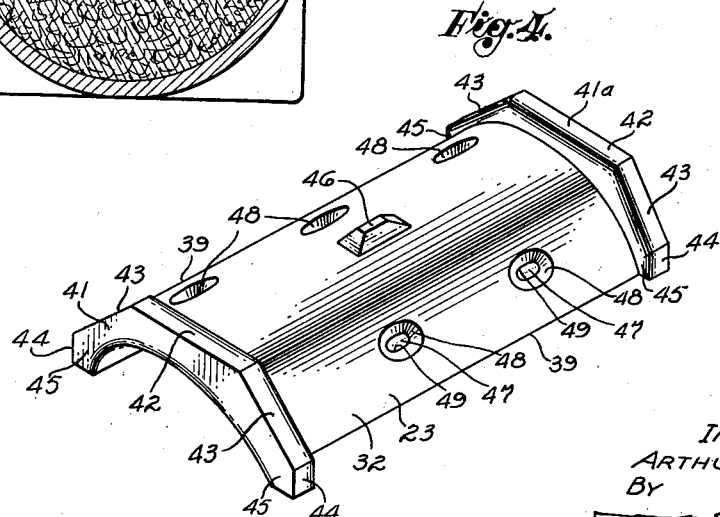
INVENTOR
ARTHUR W. LEWIS
BY
*Fred W. Lewis*
ATTORNEY.

Patented Apr. 23, 1940

2,198,053

UNITED STATES PATENT OFFICE 2,198,053

JOURNAL BEARING FOR RAILROAD CARS

Arthur W. Lewis, Pasadena, Calif.

Application April 24, 1936, Serial No. 76,281
Renewed August 29, 1939

5 Claims. (Cl. 308—79.1)

My invention relates to journal bearings of the character extensively employed to receive the journals of car axles, and relates in particular to a journal bearing of practical form having a removable and replaceable liner.

In railroad car construction the ends of the wheel axles are extended into bearing housings carried by the trucks of a railroad car. In the upper parts of these bearing housings segmental bearings or brasses are supported in such position that they will engage the upper portion of the journal so that the load of the railroad car is transmitted downwardly through the journal bearings to the upper parts of the journals of the wheel axles. These bearings or brasses are ordinarily made from a copper alloy bearing metal, such, for example, as brass or bronze, and they must be machined not only so that they will fit the journal, but also in such a manner that they will fit the equalizer or wedge employed in the bearing housings to support the same in operative position. The machine work on each one of these brasses, or bearings, constitutes a very material item in its cost.

It is an object of my invention to provide a bearing for an axle journal of the character above described having a body, the upper face of which is machined to engage the supports within the journal housing, and the lower part of which is machined to receive a relatively light weight liner which is of simple construction and may be produced with a minimum of machine work. Accordingly, in the use of my invention, that part of the bearing, namely, the bearing body, which engages the support or equalizer within the bearing housing is used over and over again; whereas, the liner is repeatedly replaced when wear thereof makes such replacement necessary.

It is a further object of the invention to provide a bearing of the character above described having a housing with a lower or inner face of concave segmental-cylindrical form, and a bearing liner of segmental-cylindrical form adapted to fit into the before-mentioned concaved surface of the bearing body, this liner having a lug projecting from an intermediate portion thereof into a pocket formed in the inner face of the bearing body.

It is a further object of the invention to provide a bearing body of the character set forth in the preceding paragraph and having recesses at the ends of its inner face adapted to receive radial flanges formed on the ends of the bearing liner. In the preferred practice of my invention, the flanges on the liner are so formed relative to the walls of the recess, that the load or the action at the ends of the liner will be transmitted through the flanges to the bearing body, and the reaction at the center of the liner will be transmitted through the lug to the bearing body.

It is a further object of the invention to provide a bearing of the character hereinabove set forth wherein the bearing body and the liner are so formed relative to each other that a lubricant-receiving space is formed between the liner and the body, there being openings through the wall of the liner connecting this space with the inner space of the liner which is adapted to engage the journal of the axle.

A further object of the invention is to provide a liner of the character set forth in the preceding paragraph wherein the openings through the liner are defined by wall portions of the liner which converge toward the bearing surface of the liner so that knife edges are formed by the meeting of the converging wall portions or surfaces defining the openings and the bearing surface of the liner which engages the journal.

Further objects and advantages of the invention will be brought out in the following part of the specification.

Referring to the drawing which is for illustrative purposes only;

Fig. 1 is a partly sectioned view showing a preferred form of my invention in use in a journal bearing housing.

Fig. 2 is an enlarged end view of the journal bearing taken from a plane indicated by the line 2—2 of Fig. 1.

Fig. 3 is a fragmentary section taken on the plane indicated by the line 3—3 of Fig. 1 showing the bearing body, liner, and journal engaged thereby.

Fig. 4 is a perspective view looking at the upper face of the bearing liner.

In Fig. 1 I show a bearing housing or box 11 of a type extensively employed on railroad cars, this bearing housing having an opening 12 through which the end of an axle 13 is extended so that the journal 14 thereof may engage a bearing 15 which in turn engages an equalizer 16 which may be provided with a rounded portion 17 adapted to engage a socket or depression 18 in the upper wall of the bearing housing, thereby providing an adjusting engagement between the equalizer 16 and the upper wall of housing 11. The bearing housing 11 is shown with its customary door 19 through which heavy oil is periodically applied to the packing 21 which has wiping contact with the journal 14.

The bearing 15 includes a bearing body 22, preferably of steel or bronze, and a bearing liner 23 which is operatively held in position by the bearing body 22. This body 22 has an upper face 24 consisting of a central portion 25, which is substantially horizontal when the bearing 15 is in operative position as shown in Fig. 1, and side portions 26 which slope downwardly and outwardly to meet vertical side walls 27. At the rightward, or forward, end of the body 22, as shown in Fig. 1, there is an upwardly projecting flange 28 adapted to engage the rightward end face 29 of the equalizer 16 when the portions 25 and 26 of the upper face 24 of the bearing body 22 are seated in a channel or recess 31 formed in the lower face of the equalizer 16.

The bearing liner 23 comprises a wall 32 which is essentially a segment of a thin-walled cylinder. The inner or bearing face 33 of the liner 23 is shaped so as to fit the journal 14, and the outer or upper face 34 of the liner 23 faces a segmental-cylindrical face 35 formed in the lower part of the bearing body 22. As shown in Fig. 3, the edges 36 of the lower or inner face 35 of the body 22 are in such spaced relation relative to the vertical side wall 27 that downwardly faced lips 37 are formed along the edges of the body 22, these lips having downwardly faced horizontal surfaces 38 lying adjacent the edges 39 of the liner 23.

The liner 23, as shown in Fig. 4, has flanges 41 and 41a projecting upwardly from the ends of its segmental-cylindrical wall 32. These flanges 41 and 41a are essentially the same in character; therefore, the description of the flange 41 likewise applies to the flange 41a. These flanges each have an upper face 42 and a pair of diagonal faces 43 extending downwardly and outwardly from the ends of the face 42 to meet vertical faces 44 at the sides 45 of the flange. The sides 45 of the flanges 41 and 41a project laterally beyond the edges 39 of the wall 32 of the liner 23, and when the liner 23 is placed in the bearing body 22, as shown in Figs. 1 and 2, the vertical faces 44 of the sides 45 lie in the vertical planes defined by the vertical side walls 27 of the body 22.

Intermediate its ends the liner 23 has an upwardly projecting lug 46 which is in the form of a truncated pyramid having a rectangular face elongated in the direction of the axis of the liner 23. The liner 23 likewise has openings 47 defined by walls 48 of conical character which converge downwardly from the upper toward the lower face 33 of the liner wall 32, so that sharp or knife edges 49, Fig. 3, are formed around the openings 47 at the bearing surface 33 of the liner wall 32.

The bearing body 22 has a pocket 51 projecting upwardly from its inner or lower face 35, this pocket 51 receiving the lug 46 as shown in Fig. 3 in such a manner that the top face of the lug 46 will engage the wall surface 52 of the pocket 51 so that the bearing load will be transmitted thereby between the intermediate portion of the body 22 and the liner 23, and the liner 23 will be prevented from shifting relative to the body 22. The bearing body 22 likewise has recesses 53 and 53a formed at the ends of its inner face 35 to respectively receive the flanges 41 and 41a of the liner 23. These recesses open downwardly and outwardly at the ends of the body 22, and each recess has downwardly directed faces 42a and 43a corresponding to the faces 42 and 43 of the flanges 41 and 41a, so that when the liner 23 is in place as shown in Figs. 1, 2, and 3 the faces 42 and 43 of the flanges at the end of the liner 23 will bear against the faces 42a and 43a whereby the reaction operating upwardly from the journal 14 through the ends of the bearing liner 23 will be transmitted through the flanges 41 and 41a to the ends of the bearing body 22.

As indicated in the preceding paragraph, the bearing load is transmitted from the ends of the bearing body 22 to the flanges constituting the ends of the bearing liner, and is also transmitted from the intermediate portion of the bearing body 22 through the lug 46 to the intermediate portion of the bearing liner 23. Between the upper surface 34 of the liner wall 32 and the inner or lower surface 35 of the bearing body 22 a space 54 is formed which may be initially packed with grease so that should the bearing liner 23 become overheated this grease will pass downwardly through the openings 47 to the face of the journal 14. During the ordinary operation of the journal bearing, rotation of the journal 14 carries grease or heavy oil from the packing 21 upwardly across the bearing face 33 of the liner 23, a portion of which grease or oil is scraped from the surface of the journal 14 by the knife edges 49 around the openings 47 so that the space 54 is normally supplied with lubricant. The ends of the recesses 53 and 53a open at the side faces 27 of the body 22 so that the sides 45 of the flanges 41 and 41a are exposed as shown in Fig. 1.

By virtue of the combination of the space 54, the openings 47, and the knife edges 49 of the openings, a new type of oil circulation in a journal box is provided. The knife edges continuously tend to divert oil upward through the openings 47 into the space 54, and the space 54 is so shallow that it causes the grease to spread out over a relatively extensive area. It is well known that there is considerable vibration and variation in direction and duration of stress incidental to the rotation of such a journal during train movement, and these fleeting effects cause a certain pulsation or breathing action in the space 54 especially as the wheels associated with the journal pass over rail ends and rail crossings. The vibratory or pulsating action tends to spread the grease or oil within the space 54 and also tends to drive lubricant from the space. Thus, the lubricant tends to flow outwardly at the ends of the space 54 through recesses 53 to lubricate the ends of the journal. Obviously, oil entering the space 54 from each opening 47 will tend to spread to all the other openings so that if any recess fails to deliver oil to the space 54, by reason of registering with a dry zone of the journal, oil will pass through that recess from the lubricating space 54 to lubricate said zone. In this manner lubrication is automatically distributed as needed.

I claim as my invention:

1. A journal bearing of the character described, for use with a bearing housing having a bearing support therein to carry a bearing in a position to receive a journal of an axle, said journal bearing comprising: a bearing body having an outer face adapted to engage said support in said housing, said body having an inner face consisting of a segment of a cylinder, there being transverse recesses at the opposite ends of said cylinder and an intermediate recess; a bearing liner comprising a segment of a cylindrical wall;

and projections on said liner to engage recesses of the bearing body to provide a lubrication space extending over a major portion of the area of the liner between the bearing body and the liner, said space communicating with said transverse recesses, there being a plurality of openings through the liner having beveled edges whereby lubricant on the surface of said journal will be diverted by said edges into said space and part at least of the lubricant expelled from said space through said transverse recesses near the opposite ends of said journal.

2. A bearing of the class described for a journal having in combination: a bearing body; and a relatively thin bearing liner removably associated with the bearing body and having a face shaped as a segment of a cylinder to extend along the periphery of said journal, said liner having portions at its sides and lubricant-damming flanges at its ends engaging said bearing body at all times during operation and forming with said body a relatively shallow but extensive lubricant reservoir, said bearing liner also having a plurality of apertures for communication between said reservoir and the journal periphery, said apertures being shallow by reason of thinness of the liner and being spaced longitudinally of the journal whereby lubricant from one circumferential zone of the journal may pass through one of said apertures in said zone into said space and return through a second aperture to the journal at a second circumferential zone spaced longitudinally of the journal from the first zone.

3. A bearing as described in claim 2, in which the apertures are in staggered disposition.

4. A bearing as described in claim 2, in which at least some of said apertures have beveled edges disposed to scoop lubricant from the periphery of the journal into said space.

5. A bearing of the class described for a journal, said bearing having in combination: a body member; and a liner member for detachable assembly with said body member and having a face shaped as a segment of a cylinder to extend along said journal, said liner member having portions at its sides and radially extending lubricant-damming flanges at its ends engaging and supporting said body member at all times during operation and cooperating with said body member to form a lubricant reservoir, one of said members having a lug within the confines of said reservoir in continuous contact with the other member, said bearing liner having a plurality of longitudinally spaced apertures communicating with said reservoir whereby lubricant will automatically flow through said apertures and space from a peripheral zone having a surplusage of lubricant to a second peripheral zone having a lesser quantity of lubricant.

ARTHUR W. LEWIS.